United States Patent

Hatrick et al.

Patent Number: 5,730,393
Date of Patent: Mar. 24, 1998

[54] AIRCRAFT PROPULSIVE POWER UNIT

[75] Inventors: Michael John Hatrick, Belfast; Edward Maurice Ashford, Craigavon, both of United Kingdom

[73] Assignee: Short Brothers PLC, Belfast, Ireland

[21] Appl. No.: 570,164

[22] Filed: Dec. 11, 1995

[30] Foreign Application Priority Data

Dec. 14, 1994 [GB] United Kingdom ............... 9425403

[51] Int. Cl.⁶ ............................................. B64C 21/00
[52] U.S. Cl. ..................... 244/110 B; 244/130; 244/204
[58] Field of Search .................................. 244/213, 110 B, 244/130, 53 R, 199, 198, 201, 204

[56] References Cited

U.S. PATENT DOCUMENTS

| | | | |
|---|---|---|---|
| 2,650,752 | 9/1953 | Hoadley | 244/130 |
| 3,097,817 | 7/1963 | Towzey | 244/209 |
| 4,039,161 | 8/1977 | Baver | 244/213 |
| 4,175,640 | 11/1979 | Birch et al. | 244/199 |
| 4,664,345 | 5/1987 | Lurz | 244/130 |
| 4,979,699 | 12/1990 | Tindell | 244/53 B |

FOREIGN PATENT DOCUMENTS

| | | | |
|---|---|---|---|
| 4103495 | 4/1992 | Japan | 244/199 |
| 516892 | 1/1993 | Japan | 244/199 |
| 987507 | 3/1965 | United Kingdom . | |
| 1166733 | 10/1969 | United Kingdom . | |
| 1 243 280 | 8/1971 | United Kingdom . | |
| 1 416 464 | 12/1975 | United Kingdom . | |
| 2 162 582 | 2/1986 | United Kingdom . | |
| 2 204 361 | 11/1988 | United Kingdom . | |
| 2 205 903 | 12/1988 | United Kingdom . | |

Primary Examiner—Andres Kashnikow
Assistant Examiner—Tien Dinh
Attorney, Agent, or Firm—Lyon & Lyon LLP

[57] ABSTRACT

An aircraft propulsive power unit having an engine (20), a nacelle structure (12) which houses the engine (20) and which has an exterior low drag boundary surface (16) which is subjected to exterior air flow in a boundary layer adjacent the boundary surface (16) and an air flow disruption device (19) activatable to cause at a control location in the boundary surface disruption of exterior air flow in the boundary layer at the control location without reversal or deflection of engine thrust gaseous flow. Where the power unit is a turbofan and the nacelle structure includes a fan duct (22) with inner and outer fan duct walls (25,26) the air flow disruption device (19) is additionally or alternatively activatable to cause at a control location in the outer fan duct wall (26) disruption of air flow in the boundary layer at the control location.

13 Claims, 4 Drawing Sheets

AIRCRAFT PROPULSIVE POWER UNIT

BACKGROUND OF THE INVENTION

The field of the present invention is aircraft propulsive power units.

For optimum performance at cruise conditions, nacelle structures for aircraft propulsion power units are designed to have exterior low drag boundary surfaces which provide for attached air flow in a boundary layer adjacent the boundary surface and efforts continue to be made to provide the best possible laminar flow over the surface. Maintenance of this objective remains paramount in nacelle structure design.

It is also well accepted that good aerodynamic braking of an aircraft following touchdown on landing is either necessary or highly desirable. For this purpose thrust reversal mechanisms are conventionally included in the aircraft propulsive power units to reverse or redirect the engine thrust gaseous flow. Thrust reversers have been regarded as an indispensable part of the power unit and are highly effective in providing a substantial part of the braking of the aircraft following touchdown.

For smaller aircraft, however, the need for heavy aerodynamic braking following touchdown is not necessary in view of the lower landing speeds and the relatively small amount of energy required to reduce the speed of the aircraft on the ground.

There is also the need to maintain low level costs for smaller aircraft and it is recognised that the inclusion of thrust reversing mechanisms in the aircraft propulsive units is best avoided on the basis that they are a costly addition and increase the weight of the aircraft which thereby reduces the capability of a civil transport aircraft to carry passengers and cargo for profit.

For smaller aircraft where turbofan power units are provided and where thrust reversers are not employed, the aircraft engines at touchdown are set to idle speed at which small but significant residual thrusts are produced and act in opposition to any braking forces applied thereby increasing the landing run of the aircraft. While the fitting of thrust reversers is not considered to be appropriate in view of the weight penalty and cost some aerodynamic braking is desirable to offset the residual thrust of the engines set to idle and it is an object of the present invention to provide a means by which this can be achieved.

SUMMARY OF THE INVENTION

According to a first aspect of the present invention there is provided an aircraft propulsive power unit comprising an engine, a nacelle structure which houses the engine and which has an exterior low drag boundary surface which extends from an upstream forward region to a downstream trailing edge region and which is subjected to exterior air flow in a boundary layer adjacent the boundary surface and air flow disruption means activatable to cause at a boundary surface control location in the boundary surface upstream of the trailing edge region disruption of exterior air flow in the boundary layer at the control location without reversal or deflection of engine thrust gaseous flow.

In an embodiment of the invention hereinafter to be described, the disruption is such as to cause or just sufficient to cause separation of the boundary layer at or downstream of the control location.

In an embodiment of the invention hereinafter to be described, the air flow disruption means comprises exterior air flow interception means provided in the nacelle structure at the control location and movable between an inoperative disposition at or below the boundary surface and an operative disposition in which it so projects from the boundary surface as to intercept the exterior air flow in the boundary layer at the control location.

In an embodiment of the invention hereinafter to be described, the exterior air flow interception means in the inoperative disposition closes an aperture in the exterior boundary surface of the nacelle structure and in the operative disposition permits air flow through the aperture.

In an embodiment of the invention hereinafter to be described, the engine comprises a core engine and a fan driven by the core engine, the nacelle structure includes an annular fan duct within which the fan is mounted and through which air from the fan is conveyed for discharge at a discharge end of the fan duct, the control location on the exterior boundary surface is upstream of the discharge end of the fan duct and the exterior air flow interception means when activated causes separation of fluid flow in the boundary layer between the control location and the discharge end of the fan duct.

In an embodiment of the invention hereinafter to be described, the fan duct has inner and outer fan duct walls which extend to the discharge end of the fan duct and which are subjected to fan duct boundary layer air flow and the air flow disruption means further comprises fan duct air flow control means activatable to cause at a fan duct control location in the outer fan duct wall upstream of the discharge end of the fan duct disruption of fan duct boundary layer air flow at the fan duct control location. The fan duct air flow control means is movable between an inoperative disposition in which it closes off an aperture in the outer fan duct wall and an operative disposition in which it is so displaced from the aperture as to cause at the fan duct control location disruption of the fan duct boundary layer air flow adjacent the outer fan duct wall.

In an embodiment of the invention hereinafter to be described, the exterior air flow interception means includes a boundary surface closure element which in the inoperative disposition closes the aperture in the exterior boundary surface of the nacelle structure and presents an exterior surface flush with the exterior boundary surface of the nacelle structure.

In an embodiment of the invention hereinafter to be described, the fan duct air flow control means includes a fan duct closure element which in the inoperative disposition of the fan duct air flow control means engages in the aperture in the outer fan duct wall and presents a surface flush with the surface of the outer fan duct wall. Furthermore, the fan duct closure element includes sealing means engagable with a rear surface of the wall to prevent air flow through the junctions between the closure element and the outer fan duct wall.

In an embodiment of the invention hereinafter to be described, the boundary surface closure element and the fan duct closure element are activatable to move together to their operative dispositions to provide for flow of air from the fan duct through the aperture in the outer fan duct wall, through the aperture in the exterior boundary surface and into the boundary layer at the exterior boundary surface of the nacelle structure. The boundary surface closure element and the fan duct closure element are component parts of a flow disruption displaceable member movable from an inoperative disposition in which the closure elements take up their inoperative dispositions and an operative disposition in which the closure elements take up their operative dispositions.

In an embodiment of the invention hereinafter to be described, the nacelle structure includes a nose cowl portion which defines an air intake duct upstream of the core engine and the fan, an intermediate portion, and an afterbody portion extending from the aft end of the intermediate portion and terminating at the discharge end of the fan duct and the flow disruption means is at the forward end of the afterbody portion. Furthermore, the core engine terminates in a discharge nozzle for the discharge of efflux gases from the core engine and the discharge end of the fan duct terminates at a position forward of the discharge end of the nozzle.

In an embodiment of the invention hereinafter to be described, the exterior air flow interception means is one of a plurality of interception means arranged in spaced relation around the nacelle structure and activatable together to provide for disruption of air flow at spaced boundary surface control locations around the nacelle structure and for disruption of air flow over substantially the full circumference of the nacelle structure. Furthermore, the fan duct air flow control means is one of a plurality of fan duct air flow control means arranged in spaced relation around the outer fan duct wall and activatable with the exterior air flow interception means to provide for disruption of air flow at spaced fan duct locations around the outer fan duct wall and for disruption of air flow over substantially the full circumference of the outer fan duct wall.

According to a second separate aspect of the invention, there is provided an aircraft propulsive power unit comprising a core engine, a fan driven by the core engine and a nacelle structure which houses the core engine and fan and which includes an annular fan duct within which the fan is mounted and through which air from the fan is conveyed and which has inner and outer fan duct walls which extend to the discharge end of the fan duct and which are subjected to boundary layer air flow, and air flow disruption means activatable to cause at a fan duct control location in the outer fan duct wall upstream of the discharge end of the fan duct disruption of air flow in the boundary layer at the control location.

BRIEF DESCRIPTION OF THE DRAWINGS

One embodiment of the invention will now be described by way of example with reference to the accompanying drawings in which.

DETAILED DESCRIPTION OF THE PREFERRED EMBODIMENT

Figure 1:
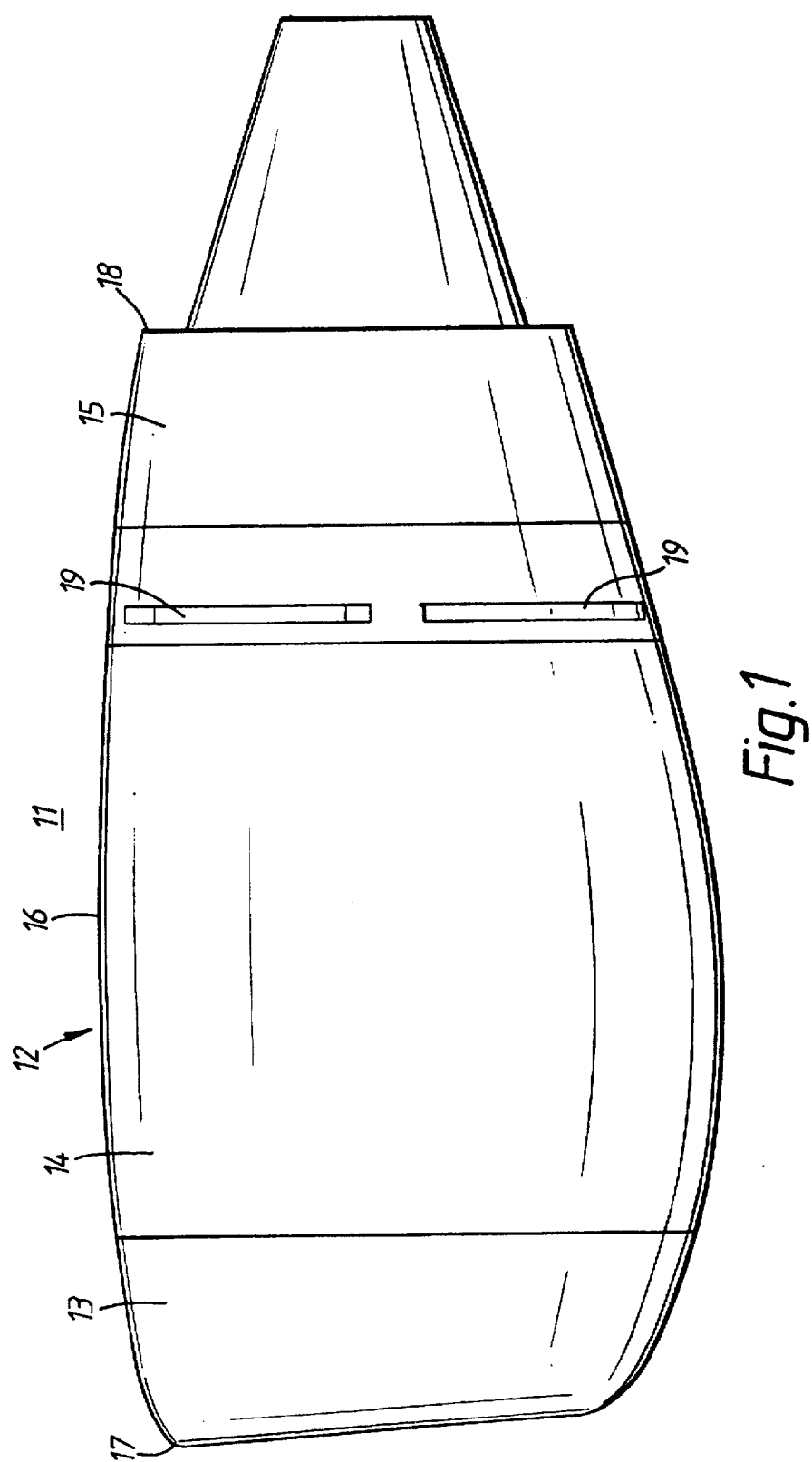
FIG. 1 is a schematic side elevation of an aircraft turbofan propulsive power unit embodying flow disruption means in accordance with the invention.

Referring first to FIG. 1, a turbofan propulsive power unit 11 is illustrated which comprises a nacelle structure 12 including a nose cowl portion 13, an intermediate portion 14 and an afterbody portion 15. The nacelle structure 12 has an exterior bounding surface 16 which extends longitudinally from a lipskin region 17 of the nose cowl 13 to a trailing end region 18 of the afterbody portion 15 and circumferentially to provide an aerodynamically efficient low drag surface encouraging smooth airflow over the surface in a boundary layer adjacent the surface.

While the exterior surface 16 of the nacelle structure 12 is made as aerodynamically efficient as possible, there is provided flow disruption devices 19 arranged in spaced relation around the nacelle structure 12 at control locations in the region of the forward end of the afterbody portion 15. The devices 19 in their inoperative dispositions present an exterior surface flush with the exterior boundary surface 16 and are activatable to operative dispositions in which they project from the boundary surface 16 to intercept the airflow in the boundary layer adjacent the boundary surface 16 as hereinafter to be more fully described.

Figure 2:
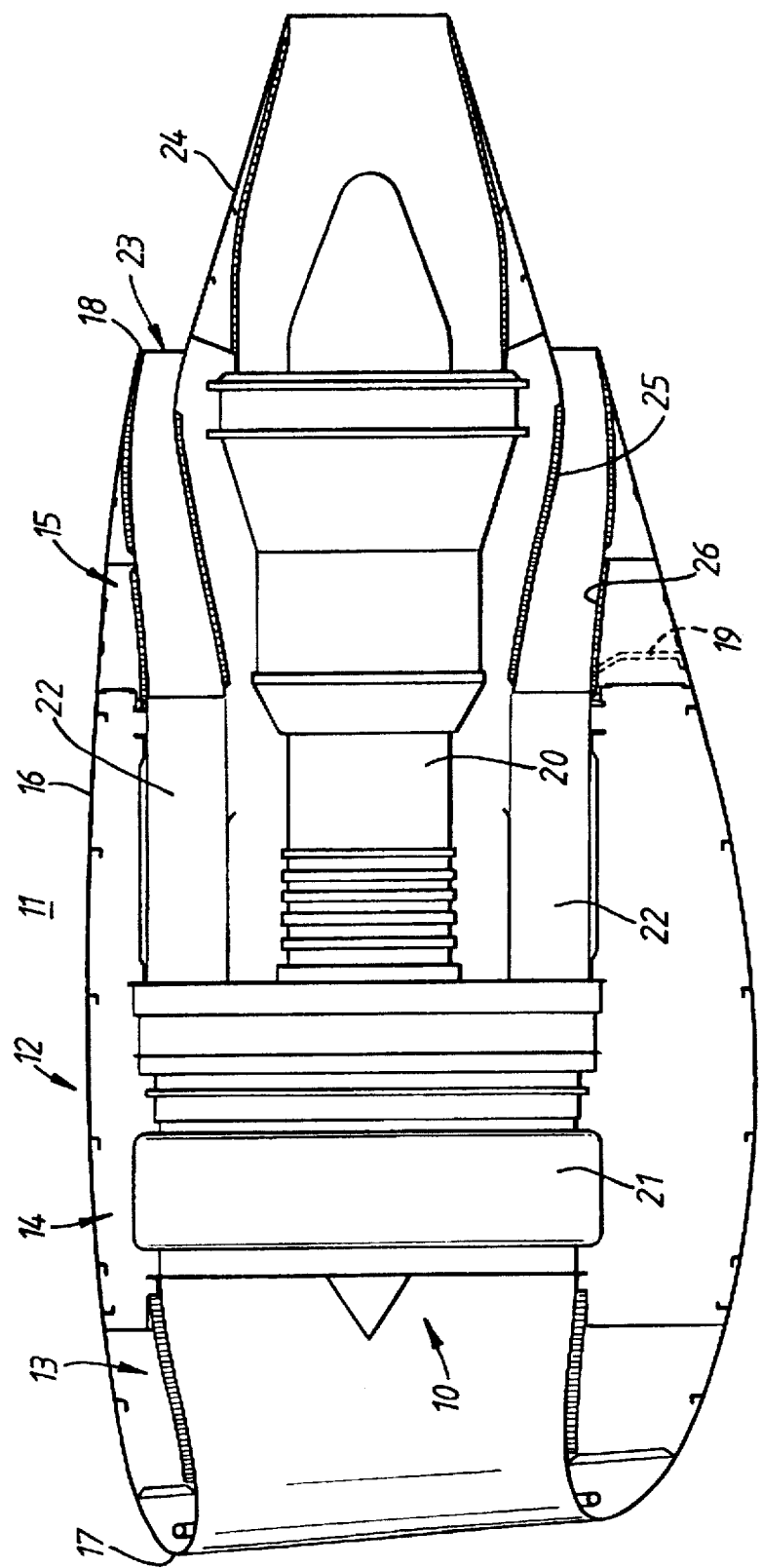
FIG. 2 is a schematic cross-sectional side elevation of the propulsive power unit shown in FIG. 1, FIGS. 3A and 3B are scrap views of the propulsive power unit shown in FIG. 2, drawn to an enlarged scale and showing in FIG. 3A the flow disruption means in an inoperative disposition and in FIG. 3B in an operative disposition.

Referring now to FIG. 2 it will be seen that the nacelle structure 12 houses a turbofan engine 10 comprising a core engine 20 and a fan 21 driven by the core engine 20. The nacelle structure 12 further includes an annular fan duct 22 within which the fan 21 is mounted and through which high pressure propulsive air from the fan is conveyed through the nacelle structure 12 for discharge at an annular discharge opening 23 which is defined by the trailing end 18 of the afterbody portion 15 and by the external surface of the forward end of an efflux nozzle 24 mounted on the rear of the core engine 20.

The fan duct 22 is formed by an inner fan duct wall 25 and an outer fan duct wall 26, both of which are so constructed and arranged within the nacelle structure as to present low drag surfaces for the airflow conveyed through the duct. In fact much attention is given to providing smooth flow in the boundary layers adjacent the inner and outer duct walls 25 and 26.

In accordance with one embodiment of the first aspect of the present invention and also in accordance with the second aspect of the invention, flow disruption means are provided which disrupts the airflow in the boundary layer adjacent the outer fan duct wall 26 and which can be employed independently of the disruption of airflow at the exterior boundary surface 16 of the nacelle structure 12 or together with it as now to be described with reference to FIGS. 3A and 3B.

Figure 3A:
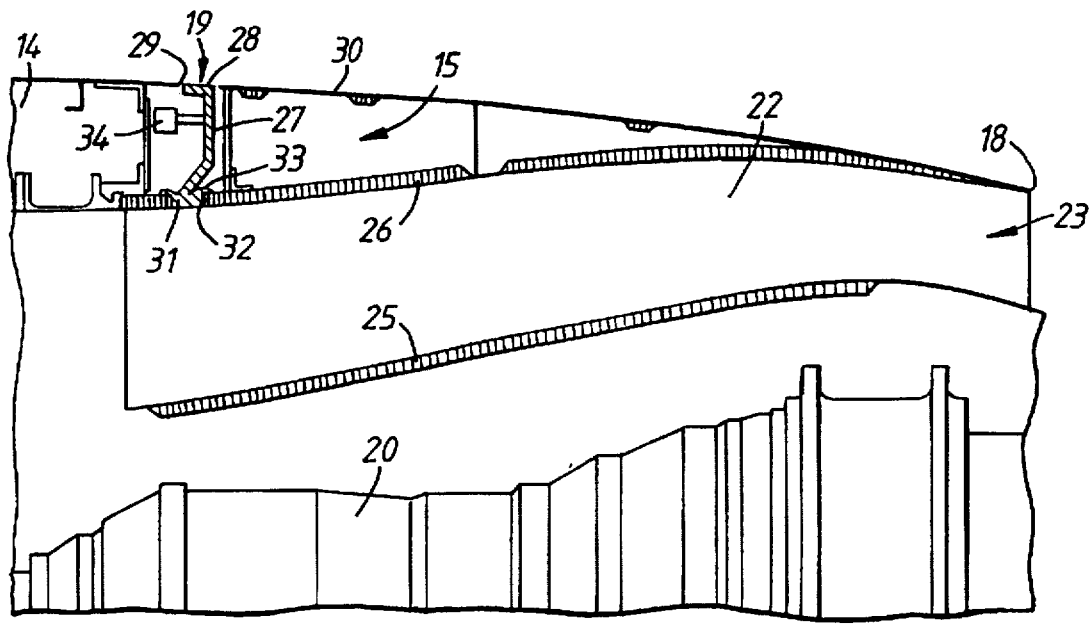

Referring now to FIG. 3A, the section shown is taken in a radial plane containing the axis of the core engine 20 and cutting through one of the flow disruption devices 19 shown in FIG. 1. The flow disruption device 19 is shown in its inoperative position in FIG. 3A and comprises an arcuate plate body portion 27 which terminates at its radially outermost edge in an arcuate closure plate portion 28 which engages in a circumferentially extending slot 29 formed in the external skin 30 of the afterbody portion 15 at a position adjacent to the forward end of the afterbody portion 15. The arcuate plate portion 28 in the inoperative position of the flow disruption device 19 lies as shown with its exterior surface flush with the exterior surface of the skin 30 and with the boundary surface 16 of the intermediate portion 14.

The radially innermost edge of the arcuate body portion 27 of the flow disruption device 19 terminates in a circumferentially extending arcuate plate 31 which in the inoperative disposition of the device 19 shown in FIG. 3A engages in an arcuate slot 32 formed in the outer fan duct wall 26 of the fan duct 22, with the inwardly facing surface of the plate portion 31 being flush with the inwardly facing surface of the fan duct wall 26. In addition sealing lands 33 extend from the rear face of the plate portion 31 and in the inoperative position of the flow disruption device 19 bear against the rear face of the outer fan duct wall 26 to provide an effective seal against airflow leakage from the fan duct 22.

Figure 3B:
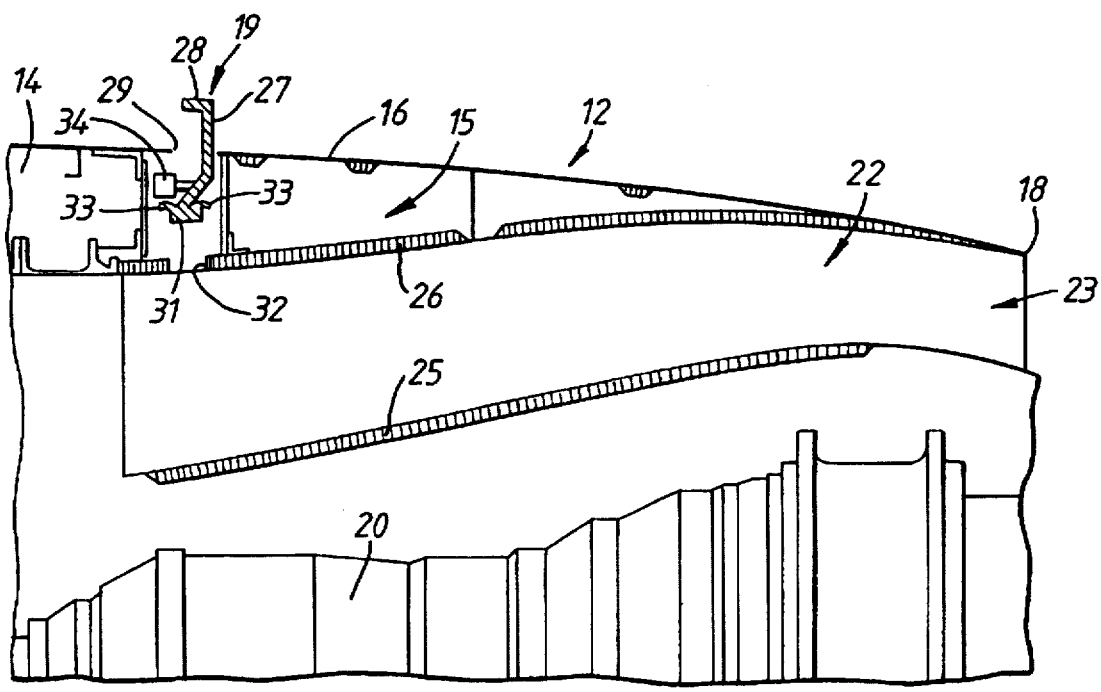

The flow disruption device 19 is movable radially outwardly under the control of an actuator 34 which responds to a control input to move the device 19 to the position shown in FIG. 3B. As will be seen, the arcuate body portion 27 in the operative position shown in FIG. 3B has moved radially outwardly into the boundary layer adjacent the exterior boundary surface 16 of the nacelle structure 12. At the same time the closure plate portion 31 has been displaced radially outwardly to leave the aperture 32 in the outer fan duct wall 26 open.

Projection of the body portion 27 of the device 19 into the boundary layer adjacent the exterior boundary surface 16 of the nacelle structure 12 disrupts the flow over the surface at that location and causes or promotes separation of the airflow from the boundary surface 16 downstream of the device 19 thereby giving rise to pronounced drag over the surface and turbulence at the trailing end 18 of that surface. At the same time, a portion of the high pressure propulsive air being conveyed in the fan duct 22 is diverted to pass through the aperture 32, through the afterbody structure 15 and the aperture 29 in the exterior boundary surface 16 and into the airflow adjacent the surface 16 where it is effective to increase disruption of the airflow downstream of the aperture 29.

Figure 4:
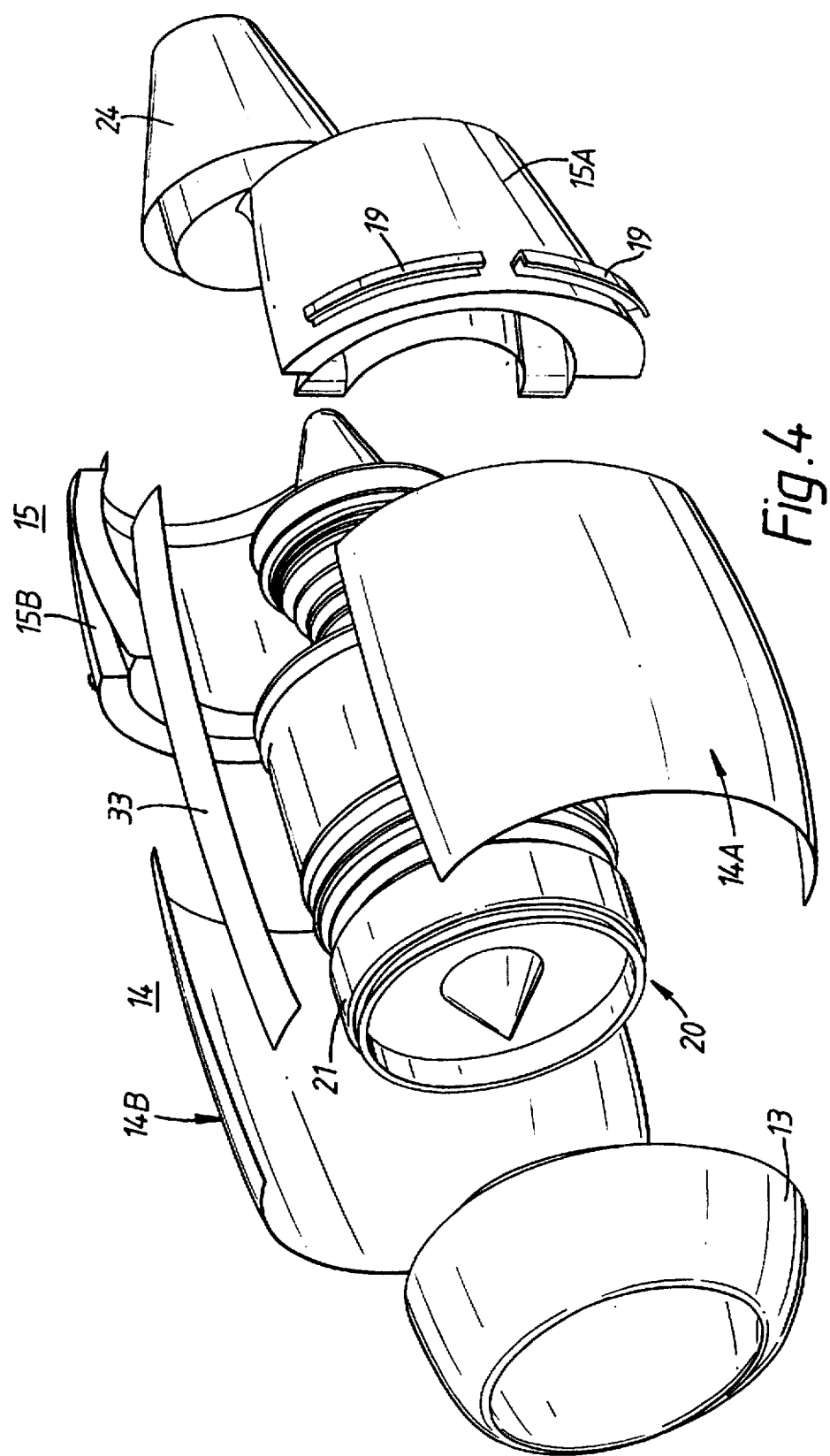
FIG. 4 is a schematic exploded perspective view of the turbofan propulsive power unit shown in FIGS. 1 and 2, further illustrating the flow disruption means in accordance with the invention.

The exploded view shown in FIG. 4 of the turbofan power unit illustrated in FIGS. 1 and 2 and FIGS. 3A and 3B reveals the core engine 20, its efflux nozzle 24 and the several parts forming the nacelle structure 12 and comprising the nose cowl 13, fan cowl doors 14A and 14B forming part of the intermediate portion 14, "C" duct portions 15A and 15B and support structure 33 shown schematically and required to provide support from the pylon structure (not shown) for underwing mounting of the power unit. The turbofan unit shown is conventional insofar as the fan cowl doors 14A and 14B are hinged along their upper edges so that they can be opened for inspection of the fan 21 and other parts on the core engine 20 and that the "C" duct portions 15A and 15B are also mounted for displacement outwardly on hinge mountings extending along the upper edges of the duct portions. The "C" duct portions 15A and 15B are however modified to embody the flow disruption devices 19 which are illustrated in FIG. 4 in their operative dispositions in which they project from the exterior surface of the "C" duct portions and cause disruption of flow as hereinbefore described.

In the embodiment of the invention hereinbefore described with reference to the drawings, flow disruption at the exterior boundary surface 16 is obtained by protrusion of a radially extending plate body portion 27. It will however be appreciated that the required disruption may alternatively be obtained by a stepped or ramp element and is therefore not restricted to the geometry shown in the drawings.

In some circumstances flow disruption at the exterior boundary surface 16 may be found sufficient to provide the required aerodynamic braking and flow disruption in the fan duct need not be utilised.

Alternatively, flow disruption in the fan duct, in accordance with the second aspect of the invention, may in some circumstances be found sufficient to provide the required aerodynamic braking and flow disruption at the exterior boundary surface not utilised.

While the flow disruption devices 19 in the embodiment of the invention hereinbefore described with reference to the drawings are arranged at control locations in the region of the forward end of the afterbody portion 15, it will be appreciated that they may in accordance with the invention be arranged at other locations on the exterior boundary surface 16 of the nacelle structure 12.

What is claimed is:

1. An aircraft propulsive power unit comprising a core engine and a fan driven by the core engine, a nacelle structure which (i) houses the core engine and fan, (ii) has an exterior low drag boundary surface which extends from an upstream region to a downstream trailing edge region and which is subjected to exterior air flow in a boundary layer adjacent the boundary surface and (iii) includes an annular fan duct (a) within which the fan is mounted, (b) through which air from the fan is conveyed, and (c) which has inner and outer fan duct walls which extend to a discharge end of the fan duct and which are subjected to boundary layer fan duct air flow, characterized by the provision of exterior air flow disruption means activatable to cause at an exterior air flow control location in the boundary surface upstream of the trailing edge region disruption of exterior air flow in the boundary layer at the exterior air flow control location without reversal or deflection of engine thrust gaseous flow and fan duct air flow control means activatable to cause at a fan duct air flow control location in the outer fan duct wall upstream of the discharge end of the fan duct disruption of fan duct boundary layer air flow at the fan duct air flow control location, disruption of the exterior air flow being such as to cause or just sufficient to cause separation of the exterior air flow boundary layer at or downstream of the exterior air flow control location.

2. A unit according to claim 1, the core engine terminating in a discharge nozzle for the discharge of efflux gases from the core engine, the discharge end of the fan duct terminating at a position forward of the discharge end of the nozzle.

3. A unit according to claim 1, the nacelle structure including a nose cowl portion which defines an air intake duct upstream of the core engine and the fan, an intermediate portion, and an afterbody portion extending from the aft end of the intermediate portion and terminating at the discharge end of the fan duct, the flow disruption means being at the forward end of the afterbody portion.

4. A unit according to claim 1, the exterior air flow disruption means comprising exterior air flow interception means provided in the nacelle structure at the control location and movable between an inoperative disposition at or below the boundary surface and an operative disposition in which it so projects from the boundary surface as to intercept the exterior air flow in the boundary layer at the control location.

5. A unit according to claim 1, the exterior air flow disruption means being one of a plurality of interception means arranged in spaced relation around the nacelle structure and activatable together to provide for disruption of air flow at spaced boundary surface control locations around the nacelle structure and for disruption of air flow over substantially the full circumference of the nacelle structure.

6. A unit according to claim 1, the fan duct air flow control means being one of a plurality of fan duct air flow control means arranged in spaced relation around the outer fan duct wall and activatable with the exterior air flow disruption means to provide for disruption of air flow at spaced fan duct locations around the outer fan duct wall and for disruption of air flow over substantially the full circumference of the outer fan duct wall.

7. An aircraft propulsive lower unit comprising a core engine and a fan driven by the core engine, a nacelle structure which (i) houses the core engine and fan, (ii) has an exterior low drag boundary surface which extends from an upstream region to a downstream trailing edge region and which is subjected to exterior air flow in a boundary layer adjacent the boundary surface and (iii) includes an annular fan duct (a) within which the fan is mounted, (b) through which air from the fan is conveyed, and (c) which has inner and outer fan duct walls which extend to a discharge end of the fan duct and which are subjected to boundary layer fan duct air flow, characterized by the provision of exterior air flow disruption means activatable to cause at an exterior air flow control location in the boundary surface upstream of the trailing edge region disruption of exterior air flow in the boundary layer at the exterior air flow control location without reversal or deflection of engine thrust gaseous flow and fan duct air flow control means activatable to cause at a fan duct air flow control location in the outer fan duct wall upstream of the discharge end of the fan duct disruption of fan duct boundary layer air flow at the fan duct air flow control location, exterior air flow disruption means comprising exterior air flow interception means provided in the nacelle structure at the control location and movable between an inoperative disposition at or below the boundary surface and an operative disposition in which it so projects from the boundary surface as to intercept the exterior air flow in the boundary layer at the control location, exterior air flow interception means in the inoperative disposition closing an aperture in the exterior boundary surface of the nacelle structure and in the operative disposition permitting air flow through the aperture.

8. A unit according to claim 7, the exterior air flow interception means including a boundary surface closure element which in the inoperative disposition closes the aperture in the exterior boundary surface of the nacelle structure and presents an exterior surface flush with the exterior boundary surface of the nacelle structure.

9. An aircraft propulsive power unit comprising a core engine and a fan driven by the core engine, a nacelle structure which (i) houses the core engine and fan, (ii) has an exterior low drag boundary surface which extends from an upstream region to a downstream trailing edge region and which is subjected to exterior air flow in a boundary layer adjacent the boundary surface and (iii) includes an annular fan duct (a) within which the fan is mounted, (b) through which air from the fan is conveyed, and (c) which has inner and outer fan duct walls which extend to a discharge end of the fan duct and which are subjected to boundary layer fan duct air flow, characterized by the provision of exterior air flow disruption means activatable to cause at an exterior air flow control location in the boundary surface upstream of the trailing edge region disruption of exterior air flow in the boundary layer at the exterior air flow control location without reversal or deflection of engine thrust gaseous flow and fan duct air flow control means activatable to cause at a fan duct air flow control location in the outer fan duct wall upstream of the discharge end of the fan duct disruption of fan duct boundary layer air flow at the fan duct air flow control location, fan duct air flow control means being movable between an inoperative disposition in which it closes off an aperture in the outer fan duct wall and an operative disposition in which it is so displaced from the aperture as to cause at the fan duct control location disruption of the fan duct boundary layer air flow adjacent the outer fan duct wall.

10. A unit according to claim 9, the fan duct air flow control means including fan duct closure element which in the inoperative disposition of the fan duct air flow control means engages in the aperture in the outer fan duct wall and presents a surface flush with interior surface of the fan duct wall.

11. A unit according to claim 10, the fan duct closure element including sealing means engagable with a rear surface of the wall to prevent air flow through the junctions between the closure element and the outer fan duct wall.

12. A unit according to claim 10, the boundary surface closure element and the fan duct closure element being activatable to move together to their operative dispositions to provide for flow of air from the fan duct through the aperture in the outer fan duct wall, through the aperture in the exterior boundary surface and into the boundary layer at the exterior boundary surface of the nacelle structure.

13. A unit according to claim 12, the boundary surface closure element and the fan duct closure element being component parts of a flow disruption displacement member movable from an inoperative disposition in which the closure elements take up their inoperative dispositions and an operative disposition in which the closure elements take up their operative dispositions.

* * * * *

UNITED STATES PATENT AND TRADEMARK OFFICE
CERTIFICATE OF CORRECTION

PATENT NO. : 5,730,393
DATED      : March 24, 1998
INVENTOR(S): HATRICK et al.

It is certified that error appears in the above-identified patent and that said Letters Patent is hereby corrected as shown below:

In claim 7 (col. 7, line 1), delete "lower" and insert therefor -- power --.

Signed and Sealed this

Twenty-fifth Day of August, 1998

Attest:

BRUCE LEHMAN

*Attesting Officer*     *Commissioner of Patents and Trademarks*